United States Patent [19]

Moodie

[11] 4,314,744

[45] Feb. 9, 1982

[54] MULTIPURPOSE FILM HANDLING CASSETTE HAVING PRELIMINARY ASSEMBLY CONDITION

[75] Inventor: Donald E. Moodie, Marblehead, Mass.

[73] Assignee: Polaroid Corporation, Cambridge, Mass.

[21] Appl. No.: 180,375

[22] Filed: Aug. 22, 1980

[51] Int. Cl.³ .............................................. G03C 11/00
[52] U.S. Cl. .................................. 352/130; 352/78 R; 354/88; 354/317
[58] Field of Search .................... 352/130, 78 R, 157, 352/72; 354/88, 303, 317

[56] References Cited

U.S. PATENT DOCUMENTS

| | | | |
|---|---|---|---|
| 3,119,300 | 1/1964 | Barocela | 352/157 |
| 3,806,245 | 4/1974 | Land et al. | 352/130 |
| 3,809,465 | 5/1974 | Mason | 352/130 |
| 3,856,390 | 12/1974 | Stella | 352/130 |
| 3,895,862 | 7/1975 | Stella et al. | 352/130 |
| 3,932,187 | 1/1976 | Batter | 352/130 |
| 4,285,581 | 12/1979 | Stella | 352/130 |

Primary Examiner—Monroe H. Hayes
Attorney, Agent, or Firm—Frederick A. Goettel, Jr.

[57] ABSTRACT

A multipurpose photographic film handling cassette is provided with a modular fluid processor assembly which is adapted to be initially supported, during cassette assembly, within the cassette housing in a preliminary assembly position wherein it is spaced from the path of the film strip and wherein it cooperates with at least one of the other cassette components to thereby permit such component to also be in a preliminary assembly position within the housing. The modular processor is displaceable from its preliminary assembly position to a final assembly position wherein the processor is supported in operable engagement with the film strip. Such movement also results in movement of one or more other cassette contained components from preliminary to final operable positions.

4 Claims, 7 Drawing Figures

MULTIPURPOSE FILM HANDLING CASSETTE HAVING PRELIMINARY ASSEMBLY CONDITION

BACKGROUND OF THE INVENTION

This invention relates to multipurpose photographic film handling cassettes in which an exposed film strip contained in the cassette may be processed, viewed by projection and rewound automatically without removal from the cassette in accordance with information supplied by the condition of the cassette and the film strip contained therein. More particularly, it concerns an improved arrangement for an initially sealed processing fluid containing reservoir arrangement which forms part of the film processing organization of such cassettes.

Multipurpose photographic film cassettes have been developed for use in cinematographic systems such as those illustrated and described, for example, in U.S. Pat. No. 3,615,127 issued to Edwin H. Land on Oct. 26, 1971; U.S. Pat. No. 3,623,417 issued Nov. 30, 1971, to Vaito K. Eloranta; U.S. Pat. No. 3,785,725 issued Jan. 15, 1974 to John F. Batter, et al.; U.S. Pat. No. 3,895,862 issued July 22, 1975 to Joseph A. Stella, et al.; and U.S. Pat. No. 4,105,307 issued to William A. Holmes, et al. on Aug. 8, 1978, all of which are owned by the assignee of the present invention.

In such systems, a strip of photographic film contained in a cassette can be exposed in a camera adapted to receive the cassette and then processed to provide viewable images by placing the cassette in a viewing apparatus equipped to activate a cassette-contained processor upon rewinding the exposed film strip. After processing in this manner, the viewing apparatus is operated as a projector to advance the film incrementally frame by frame past a light source so that the scene to which the film was exposed is reproduced in a manner well known in the motion picture art.

In systems of this type, the processing operation, after film exposure and before viewing, entails the deposition of a uniform coating of processing fluid along the length of the film strip to effect a diffusion transfer of a negative image in light sensitive emulsion layer on the film strip to a positive image receiving layer or interface. The processing fluid supply is contained in an initially closed reservoir or pod housed within the film cassette. The reservoir is provided with a removable tear tab closure capable of being opened upon activation of the processor by the viewing apparatus to allow the fluid to escape from the pod and pass through a nozzle-like opening for deposit on the exposed emulsion layer on the film strip. Although the processor is operated only once in any single cassette, its operation to achieve a uniform and complete layer of processing fluid over the exposed emulsion layer on the film strip is vital to satisfactory operation of the overall system since any defect in the operation of the processor will result in undesirable and permanent blemishes plainly observable during projection of the processed film.

To ensure retention of the processing fluid in the cassette-contained reservoir or pod up to the time it is needed for the processing operation, and also in some measure to ensure complete availability of the processing fluid upon initial activation of the processor, the processing fluid reservoir in such systems is provided with a relatively large opening covered initially by a releasably bonded tear tab closure capable of being completely peeled from the opening to release the processing fluid for distribution against the emulsion layer of the exposed film strip. In prior systems of the type mentioned above, the tear tab initially sealing the processing fluid reservoir extends from one end of the reservoir opening to the other at which it is folded back upon itself.

As described in the above-noted U.S. Pat. No. 3,895,862, no viewer-mounted or other external means is needed for effecting a release of processing fluid from the initially sealed storage reservoir to initiate the processing cycle automatically upon rewinding the film strip after exposure in the cassette. The release of processing fluid from the reservoir is brought about by a pull strip extension connected at one end to the folded-back portion of the reservoir sealing tear tab and having at its free end, a configuration adapted to operatively engage an aperture formed in the trailing end portion of the film strip attached to the supply spool during initial rewind rotation of the supply spool. The pull strip, which may be mylar or other similar material having the physical characteristics of a photographic film strip, is initially supported and constrained to an essentially S-shaped tortuous path in which the intermediate leg is established by a channel formed by internal cassette walls. The pull strip accordingly extends initially upward in confronting relation with the tear tab, then makes a downward turn passing through the aforementioned channel and makes a second turn at the lower end thereof before exiting from the channel. At its exit from the channel, the extension is bent back on itself without exceeding the elastic limits of the material from which it is made so that the projecting free end lies yieldably against the outer convolutions of the film strip on the supply spool. As the film strip pays out from the supply spool during exposure, the free end of the pull strip will move inwardly due to the diminishing diameter of film strip convolutions on the supply spool until the film strip is completely exposed. At this time, an aperture in the supply spool connected trailing end portion of the film strip will have passed the free end of the pull strip extension so that upon rewinding of the film strip back onto the supply spool, a latching tongue at the free end of the pull strip will engage the film strip aperture and become entrained between successive convolutions of the film strip supply spool training end portion. Continued rewind rotation of the supply spool will effect a pulling action on the pull strip causing it to advance through the S-shaped tortuous path and correspondingly, resulting in peeling of the tear tab closure from the processing fluid reservoir to release the processing fluid for application thereof to the exposed film strip. After having been peeled completely from the processing fluid reservoir, the tear tab may be disengaged from the pull strip by a knife-like formation at the exit of the channel formed by the internal cassette walls. The removed tear tab closure will remain in a storage chamber defined by the channel once the processing cycle has been complete.

In order to define the above-noted S-shaped path at the processing station, a plurality of internal cassette transverse wall formation which form an integral part of the cassette have been necessitated. Further wall formations have been utilized in order to define a pair of chambers, one communicating to the processing fluid applicator nozzle and a second defining an initially sealed reservoir for the processing fluid which opens along one upright side of this chamber at a planar face to which the releasable tear tab closure is initially fixed. In practice, the fluid chamber actually provides an internal receptacle for a prefabricated, self-contained pod of processing fluid to which the tear tab closure is affixed. In this way, cassette assembly is facilitated by placing the pod in the chamber, threading the tear tab through the S-shaped path and then sealingly attaching a processor top to the upstanding wall formations defining the S-shaped path and the pair of fluid chambers.

It should be appreciated, accordingly, that in order to achieve reliable operation of such a processor, careful attention to assembly of the processor is necessary; the concommitant cost associated with such assembly is not insignificant In order to assure reliable separation of the tear tab from the processing fluid reservoir, a number of arrangements have been implemented in order to minimize drag as the pull strip passes through its path. One such example is illustrated in U.S. Pat. No. 4,110,018 to F. M. Finnemore and assigned to the assignee of the present invention wherein low friction guide arrangements are provided to guide the pull strip along its desired path. Such an arrangement, of course, required added piece parts, additional assembly steps and accordingly, further added cost to the final assembled cassette.

Copending U.S. patent application Ser. No. 108,521, filed Dec. 31, 1979, also assigned to the assignee of the present invention, relates to a processing fluid applicator for use in such a multipurpose film cassette wherein the fluid reservoir, the fluid applicator nozzle and a tear tab closure are assembled in a modular fashion such that they may be preassembled with the reservoir housing filled with processing fluid and sealed with the tear tab closure over an opening provided in a downwardly facing surface of the reservoir and with the fluid deposition nozzle supported by the reservoir in spaced relationship with the tear tab sandwiched therebetween. Such modular assembly obviates many of the above-mentioned intricacies of such a fluid processor and it is towards further simplification of such a fluid applicator that the present invention is directed.

SUMMARY OF THE INVENTION

The present invention relates to a multipurpose film cassette of the type described hereinabove having a housing containing for exposure and processing a strip of photographic film. The cassette is provided with a modular fluid processor assembly which includes a fluid reservoir initially filled with processing fluid and sealed by a tear tab closure. A fluid deposition nozzle is supported in a desired position with respect to the housing. The cassette housing is provided with support means which cooperate with the modular processor for releasably supporting the processor in a first or preliminary assembly position within the housing where it is spaced from the path of the film strip through the cassette housing and wherein it cooperates with at least one of the other cassette components to thereby permit such component to also be in a first or preliminary assembly position within the housing. The modular processor is displaceable from its preliminary assembly position to a second or final assembly position wherein the processor is supported in operable engagement with the film strip and thus is capable of actuation to effect the fluid deposition process. The movement of the processor from the preliminary assembly position to the final assembly position also results in movement of one or more cassette-contained components from a preliminary to a final operable position.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

DESCRIPTION OF THE PREFERRED EMBODIMENT

Figure 1:
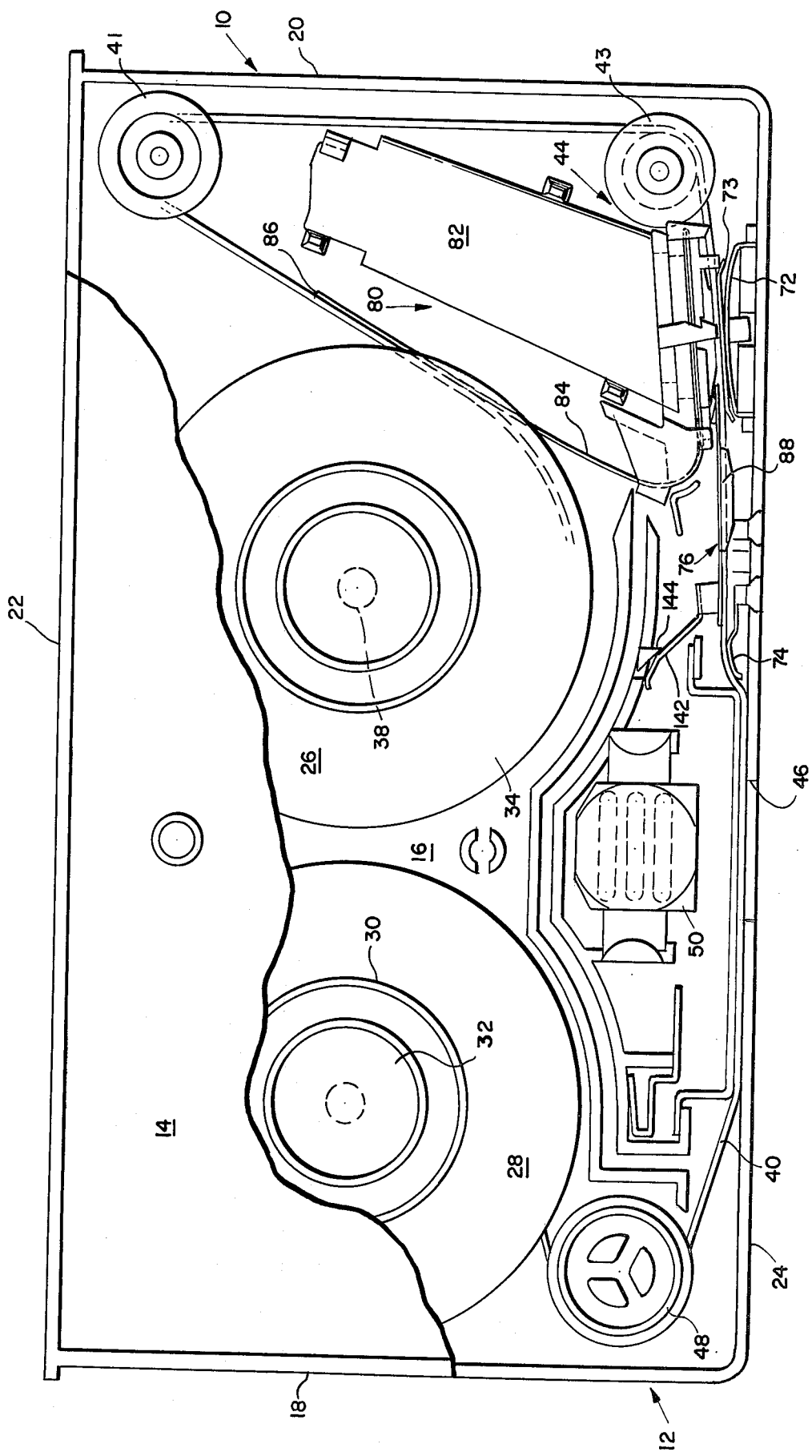
FIG. 1 is a side elevation of the film cassette of the present invention with the front wall thereof cut away and other portions thereof in partial section to illustrate the internal working components.

In the drawings, a multipurpose cassette incorporating the improvement of the present invention is generally designated by the reference numeral 10. As shown in FIG. 1, the cassette includes a generally parallelepiped casing or housing 12 established by planar faces or side walls 14 and 16, end walls 18 and 20 and elongated top and bottom edge walls 22 and 24, respectively. A pair of spools respectively designated hereinafter as supply spool 26 and take-up spool 28 are rotatably supported in the housing by annular, light-tight bearings 30 on the spools which are engaged by complimenting ring-like embossments (not shown) on the interior of the side walls 14 and 16. Also, each spool is provided with a drive socket 32 for engagement by an appropriate drive shaft on either of the camera (not shown) or the viewing apparatus (not shown) with which the cassette is used in accordance with the overall system described in the prior references cited above. Each of the spools 26 and 28 is further provided with a pair of opposed flanges 34 and 36 affixed to opposite ends of central hubs 38 to which opposite ends of a film strip 40 are permanently connected. Although the film strip will be described in more detail below, it will be noted from FIG. 1 that the path of the film strip 40 in the housing 12 extends from the hub 38 of the supply spool 26 about guide rollers 41 and 43 across a normally inoperative film processing station 44, past an opening 46 in the bottom edge wall 24, about a third guide roll 48 and from there to the take-up spool 28. The opening 46 functions at different times to facilitate both exposure and projection of the film strip 40. A prism 50 is located behind the film strip at the opening 46 to facilitate the projection operation.

Figure 6:
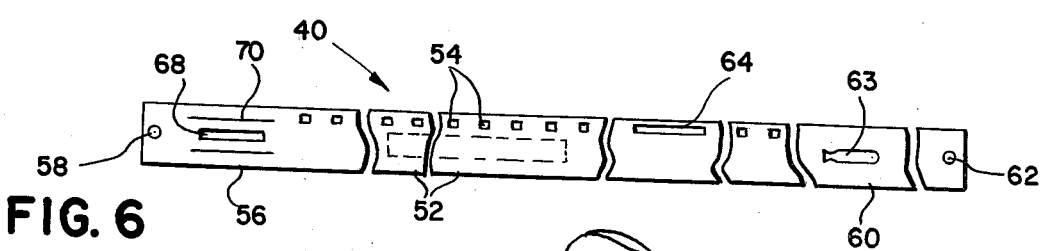
FIG. 6 is a fragmentary plan view of the film strip to be used in the cassette shown in FIG. 1.

The film strip 40 functions as an operating component in the cassette over and above its principle function of recording photographic images and is shown in its full length in FIG. 6 of the drawings. As shown, the film is provided with a major central portion 52 of usable film upon which projectable images may be formed. To this end, the film strip includes a carrier base of any suitable strong transparent material carrying an emulsion or photosensitive coating of any conventional variety; for example, an emulsion developed by a monobath processing composition to form a positive transparency suitable for projection. Also, a series of uniformly spaced spocket holes 54 are provided along the length of the film to facilitate incremental film advance during exposure and projection. At least the carrier base of the film strip extends beyond the end of the central portion of the usable film 52 to provide at one end a leading end portion or take-up leader 56 having an aperture 58 therein by which the take-up leader may be permanently affixed to the hub of the take-up spool 28. A trailing end portion or supply leader 60 at the opposite end of the strip is similarly provided with an aperture 62 for permanent connection to the hub 38 of the supply spool 26. The supply leader 60 is also provided with a bottle shaped aperture 63 to engage a free end 86 of a tear tab closure 84, as will be described below, to initiate the processing cycle.

The strip is additionally provided with an elongated spocket hole 64 of the approximate and proportionate length illustrated in FIG. 6, for the purpose of interrupting advancement of the film strip by the incremental drive mechanism provided in the camera and the projecting apparatus with which the cassette is used. The film strip is further provided in its take-up end 56 with a configuration comprising a centrally disposed opening 68 flanked by a pair of elongated slots 70.

Turning again to FIG. 1, a balanced pressure pad 73 supported by a bowed spring 72 retains the film strip 40 in operative relation to a processing fluid applicator nozzle 78 during processing. Additionally, the opening 68 and the slots 70 provided in the film strip (see FIG. 6) function at the end of the processing cycle to engage a finger 74 carried at one end of a valve member 76 and serve to move the valve member responsive to movement of the film strip to seal the nozzle 78 at the processor station 44 at the end of the processing cycle. The operation of the balanced pressure pad 73 and spring 72 is more fully described in U.S. Pat. No. 3,951,530 issued to Frank M. Czumak, et al. on Apr. 20, 1976. Further, a bowed pressure pad spring arrangement which may be used with the present invention is shown and described in copending U.S. patent application Ser. No. 26,908 filed on Apr. 4, 1979 also assigned in common with the present invention.

The processing station sealing operation by the valve 76 responsive to film strip advancement is also more fully described in U.S. Pat. No. 4,187,009 to Joseph A. Stella, also owned by the assignee of the present invention. Since the above noted patents fully describe these operations, no further detailed discussion will be presented here and only those aspects necessary for the understanding of the present invention will be discussed.

Figure 2:
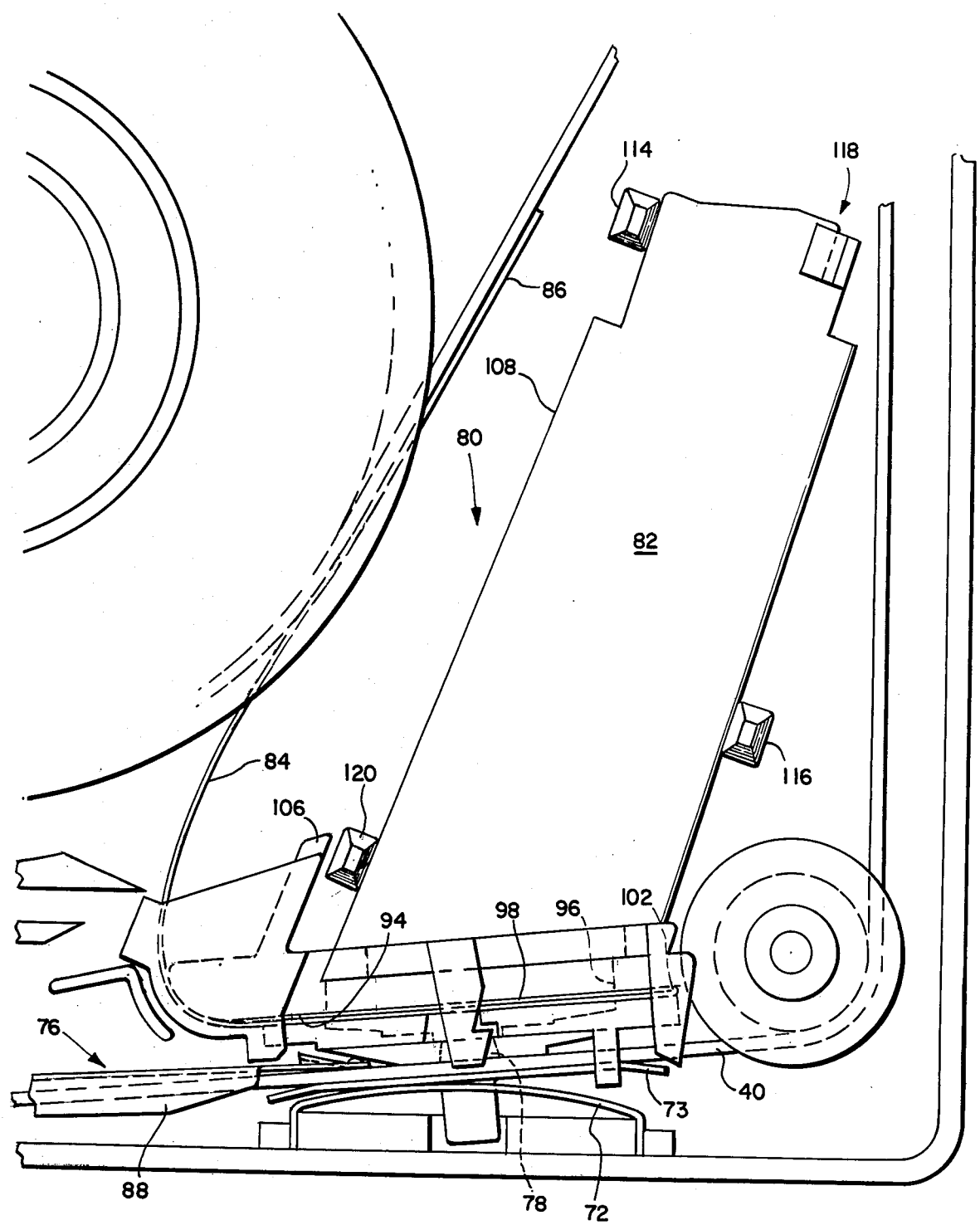
FIG. 2 is an enlarged view of the processor region of the cassette of FIG. 1 showing the modular processor in its final assembly condition.
Figure 3:
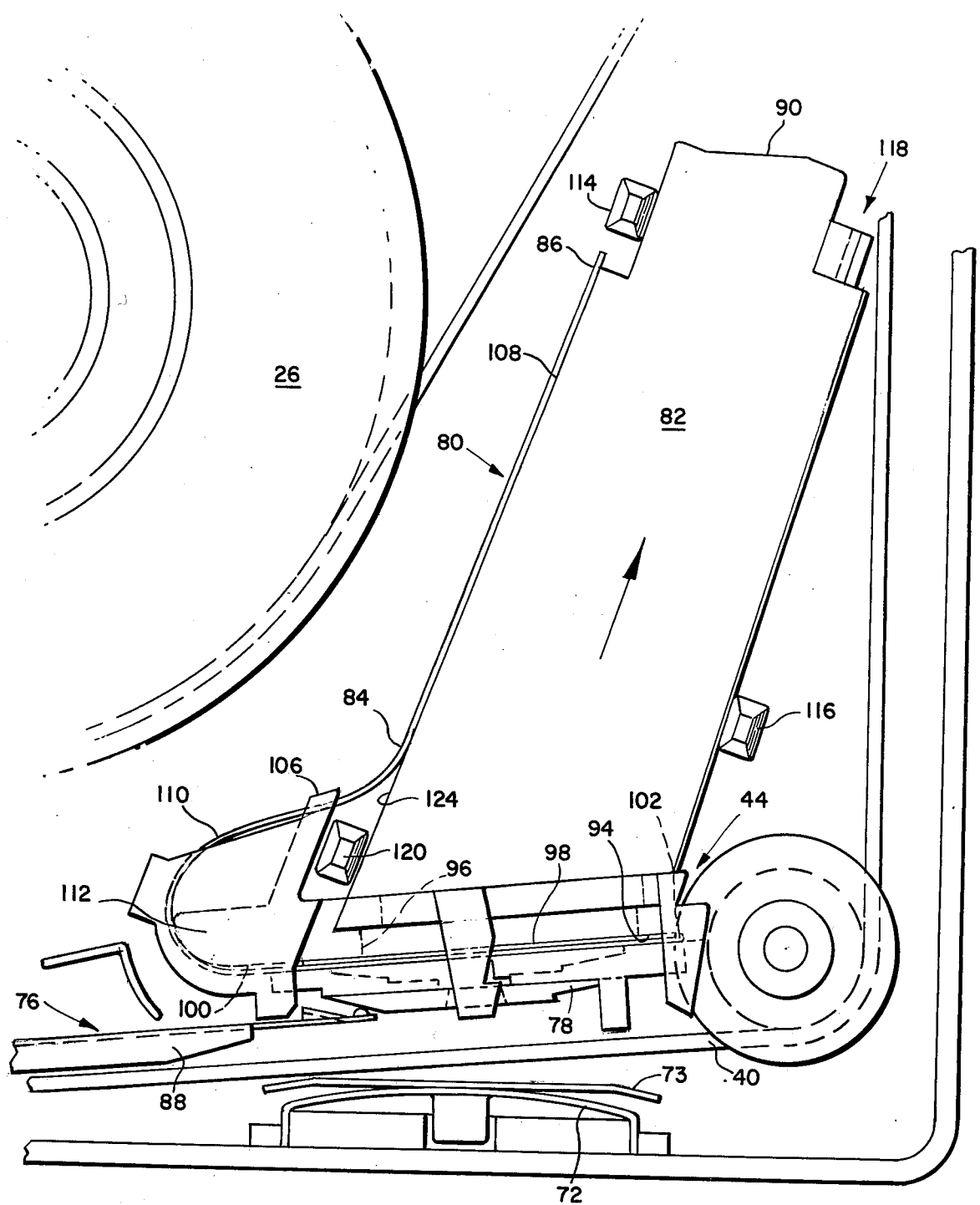
FIG. 3 is a view similar to FIG. 2 showing the modular processor in its preliminary assembly position.
Figure 4:
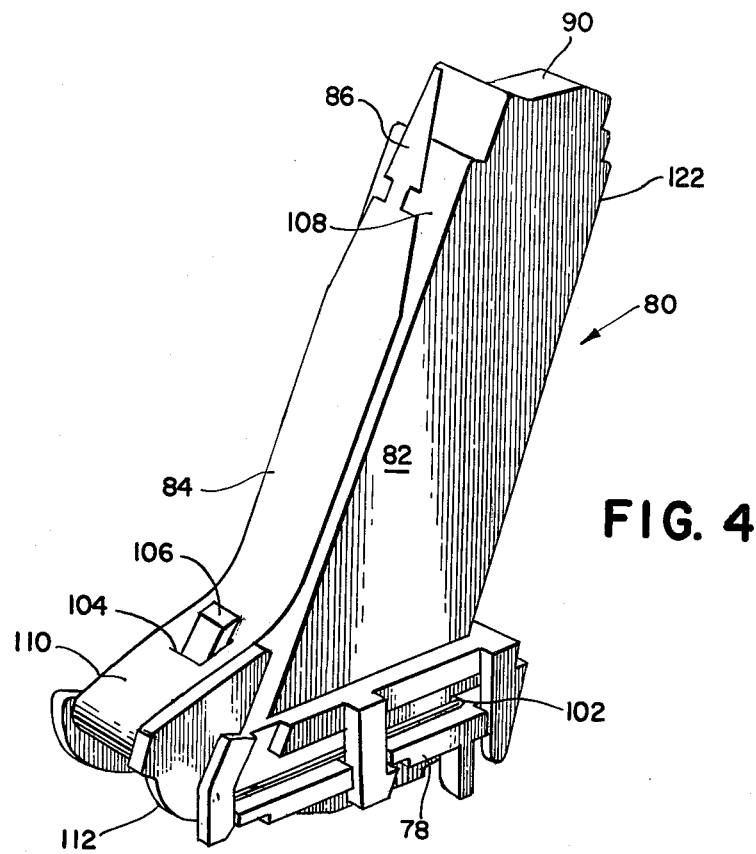
FIG. 4 is an enlarged perspective view showing the modular fluid applicator assembly of the present invention as assembled and ready for positioning in the cassette housing into its preliminary assembly position.

With reference now to FIGS. 1-4, it will be seen that the fluid applicator according to the present invention comprises a modular fluid applicator assembly 80 which is shown in FIG. 4 prior to installation in a film cassette 10. The major components of the modular applicator assembly 80 include a fluid reservoir 82, a reservoir sealing tear tab 84 and the fluid applicator nozzle 78 which are assembled in an integral unit which may be assembled separate from the cassette and readily snap-fitted into the cassette in operative engagement with other cassette components in a two-step assembly technique which will be described in detail hereinbelow.

In order to appreciate the benefits of the present invention, it will at this point be emphasized as stated hereinabove, that the film strip 40 of the present cassette functions as an operating component of the cassette in that it actuates the cassette contained processor responsive to film advancement, and also, responsive to film advancement effects the disabling of the processor following complete processing of an exposed film strip. In order to facilitate such operations, the film strip, as a matter of necessity, as it passes through its operating path within the cassette, is in operable contact with at least several of the cassette components when the cassette is in its final assembly condition. With specific reference to FIG. 2, three areas where other operating components of the cassette, more specifically the processor are in positive contact with a portion of the film strip will be described.

The first location is the portion of the film strip 40 extending from the supply spool 26 to the roller 41 in the upper right hand corner of the cassette. This stretch of film strip, when the cassette is in its final assembly condition is engaged by the free end 86 of the tear tab 84, such condition being necessary in order for the free end 86 of the tear tab to operably engage the bottle shaped aperture 63 in the supply spool leader 60 to facilitate removal of the tear tab to initiate the processing of the film strip as described in the background of the invention hereinabove.

A second area of contact between the film strip 40 and components of the cassette contained processor is in the region directly underlying the processor's fluid deposition nozzle 78 wherein the film strip is urged into contact with the nozzle by the above described pressure pad 73 and pressure pad spring 72. Again, such positive contact is necessary in order for the processing fluid to be properly applied to the emulsion bearing surface of the film strip.

The third region of contact of the film strip with a cassette contained component is in the region to the left of the above-described nozzle/pressure pad engagement wherein the film strip passes in contact with the valve member 76 described hereinabove which is engaged by and advanced by the film strip to seal off the processor nozzle 78 following processing. With reference to both FIGS. 1 and 2, it will be seen that the film strip 40 passes between a pair of side cams 88, only the upper one of which is shown in the drawing figures, which cams form an integral part of the valve 76. These side cams 88 function, during the displacement of the valve 76 to operatively engage the pressure pad 73 and displace the pad downwardly away from the film strip 40 so as to deactivate the pressure pad and to free the film strip 40 for unrestricted travel through the nozzle/pressure pad region during projection and rewind cycles following processing.

With the above relationship between the film strip and the other processor components in mind it will be appreciated that proper threading of the film strip 40 through its above-defined path in the cassette is a difficult operation in that it is required to hold the cassette components out of contact with the film strip in order to lead the film strip through its proper path in contact with such components. More specifically, in order to lead the film strip from the supply spool 26 to the roll 41, it is necessary to hold the free end 86 of the tear tab closure 84 out of engagement with the film strip. Further, in order to lead the film through the region where it is in positive contact with the downwardly facing nozzle 78 and upwardly facing pressure pad 73, it is necessary to displace the pressure pad downwardly against the force of the pressure pad spring. In addition to being inconvenient such displacement increases the possibility of overstressing or otherwise disabling the pressure pad spring.

Similarly, in order to thread the film strip past the processor disabling slide value 76, it is necessary to thread the film strip between the pair of processor disabling cams 88 described above.

According to the present invention, the modular processor is assembled in such a manner and installed in the cassette in a preliminary assembly position such that threading of the film strip, during placement of the modular processor within the cassette, may be readily accomplished through the areas wherein positive contact with the film strip is critical for proper operation of the cassette and which facilitates displacement to a fixed final assembly position wherein all of the above-described positive contacts with the film strip are readily achieved.

Looking more specifically at the modular fluid applicator 80, the fluid reservoir 82 comprises basically a six-sided fluid housing which tapers somewhat from a narrow dimension at its upper end 90 to a larger dimension at the lower end thereof wherein a lower downwardly facing exterior surface 94 thereof is provided with a rectangular opening 96 through which processing fluid is introduced into the interior of the housing prior to sealing thereof with the tear tab 84 which further permits passage of the processing fluid from the reservoir upon removal of the tear tab. The configuration of the upper end 90 of the housing is shown in detail in FIG. 7 and will be described more completely hereinbelow.

As in the above cited U.S. patent application Ser. No. 108,521 and with particular reference to FIGS. 3 and 4, the tear tab closure 84 comprises a first length thereof 98 which initially sealingly engages the downwardly facing surface 94 of the reservoir housing sealing the processing fluid within the housing and which extends from left to right as viewed in the above noted drawings. The tear tab 84 further includes a second length thereof 100 which is folded back upon the first length at a fold 102 and which with the cassette in its final assembly condition extends therefrom to a location with respect to the film strip as shown in FIG. 1 wherein it may be engaged by the film strip and be removed from sealing engagement with the downwardly facing surface 94 in accordance with the teachings of U.S. Pat. No. 3,785,725.

Figure 5:
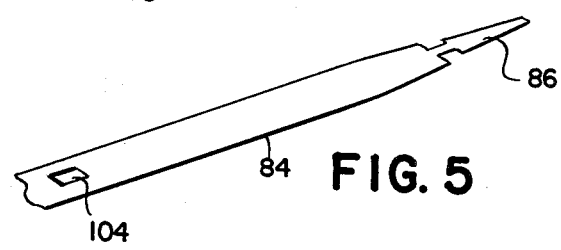
FIG. 5 is an enlarged fragmentary plan view of the free end of the pull strip.

The modular processor assembly 80, however, is shown in FIGS. 3 and 4 in a preliminary condition, FIG. 4 showing the assembly prior to placement in the cassette and FIG. 3 showing the assembly in its preliminary assembly position within the cassette housing. With reference to FIGS. 4 and 5, it will be seen that the second length 100 of the tear tab 84 is provided with a rectangular aperture 104 therein which is adapted to be releasably engaged by a retaining finger 106 integrally formed with the reservoir housing 82. The retaining finger 106 extends for a short distance in a direction substantially parallel to, and is spaced from, the left hand side wall 108 of the reservoir housing 82. The rectangular aperture 104 in the tear tab and the retaining finger 106 are positioned with respect to one another such that the second length 102 of the tear tab as it passes from below the reservoir housing, defines a relatively large radius curve 110 which curve is facilitated by suitable guiding structure 112 to the left of the retaining finger 106 which is also integrally formed with the reservoir housing 82.

Accordingly, the above defined relationship permits the modular processor assembly 80 to be assembled as shown in FIG. 4 with the free end 86 of the pull strip releasably retained in confronting relationship with the left hand side wall 108 of the reservoir housing thus retaining the free end 86 of the tear tab in a relatively unobtrusive position and yet not subjecting the flexible tear tab to any undesirably sharp bends which may interfere with the resiliency or memory of the tear tab which is necessary in order for it to follow the outermost convolution of the film strip in order to facilitate the above-described engagement of the free end of the tear tab with the film strip to initiate the processing operation.

The modular processor assembly 80, as depicted in FIG. 4, thus is in condition to be installed in its preliminary assembly position within the cassette housing 12. Such preliminary assembly condition is shown in detail in FIG. 3 wherein it will be seen that the modular processor assembly 80 is supported by cooperating structure contained within the housing, which will be described in detail hereinbelow, in a position displaced upwardly and somewhat to the right from its normal final assembly position which is depicted in FIG. 2. Turning back to FIG. 3, it will be seen that with the modular processor assembly 80 in this preliminary assembly position, the path of the film strip 40 extending from the supply spool 26 around the two rollers 41 and 43 through the region of the processing station 44 and past the processor disabling valve 76 is substantially unencumbered and accordingly, following placement of the processor 80 in the preliminary assembly position, the film strip 40 may be readily threaded through its desired path without interference by any of the above-described cassette components.

Looking now more closely at the processor supporting structure, it will be seen that in the depicted embodiment four upstanding posts integrally formed with the side wall 16 of the housing 12 are positioned so that two of such posts engage each of the opposing parallel side walls of the processor housing. The post 114 engaging the upper left hand portion of the reservoir housing 82 and the post 116 engaging the lower right hand side of the opposite wall serve as indexing elements and as shown may be configured to taper from a relatively small cross-section upper end to a larger cross-section root portion wherein they are integrally formed with the cassette housing. The posts 118 and 120, respectively, engaging the upper right side 122 and lower left hand side 124 of the housing serve functions, in addition to positioning of the housing, which will now be described.

Figure 7:
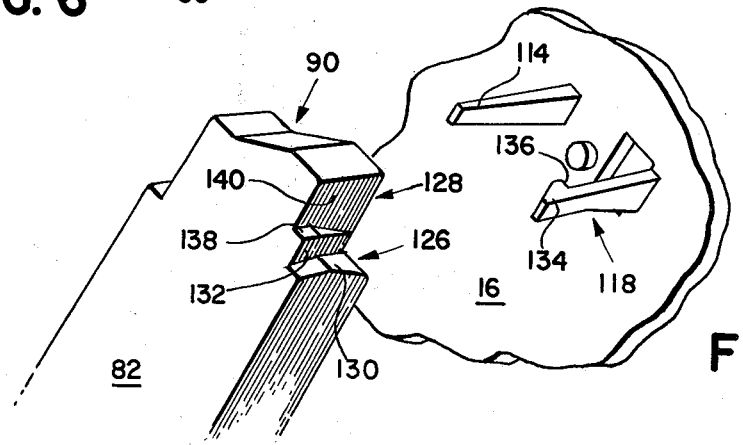
FIG. 7 is an enlarged perspective view of the details of the upper right-hand end of the processor reservoir.

Looking at FIG. 7, it will be seen that the right hand side of the upper end 122 of the processor housing 82 comprises a double step configuration which provides a first or preliminary assembly support configuration 126 to be engaged by the upstanding post 118 in the upper right hand corner and a second or final assembly support configuration 128 which the post 118 engages upon displacement of the modular processor 80 to its final assembly position. The preliminary support configuration 128 is defined by a first step 130 and an adjacent perpendicularly extending side wall portion 132. Both a portion of the step 130 and the side wall portion 132 as they extend upwardly from the side wall 6 of the processor housing are tapered to facilitate engagement thereof by the upstanding post 118 upon preliminary assembly. The post 118 is shown in engagement with such first step 130 and its adjoining surface 132 in FIG. 3 wherein it will be noted that the upstanding post 118 is provided with an enlarged head portion 134 defining a downwardly facing surface 136 which serves to further retain the processor housing in the desired position. The second or final assembly support configuration 128 is similarly defined by a second step 138 and an adjacent perpendicularly extending side wall portion 140.

Movement of the upstanding post 118 into engagement with the final assembly configuration is accomplished following installation of the modular processor in the condition of FIG. 3 by simply displacing the entire modular processor assembly 80 downwardly and to the left within the confines defined by the four upstanding posts. Such downward displacement results in the upstanding post 118 in the upper right hand corner, which is partially flexed outwardly when in the preliminary assembly position, to snap inwardly to engage the second step and, accordingly, retain the processor housing 82 in its final assembly position. It should be noted that when in this position, again as depicted in FIG. 2, the modular processor nozzle 78 moves downwardly into positive engagement with the film strip 40, sandwiching the film in its operative position between the nozzle 78 and the pressure pad 73.

Looking now back to FIG. 3 wherein the modular processor is in its preliminary assembly condition, it will be noted that the upstanding post 120 engaging the lower left hand side wall 108 of the modular processor lies within the space defined by the retaining finger 106 which releasably engages the rectangular aperture 104 in the tear tab 84 and lies below the portion of tear tab extending parallel to the left hand side wall of the housing. With this relationship in mind, it should be evident that upon the above described downward movement of the modular processor 80 from its preliminary assembly position to its fixed final assembly position that the upstanding post 120 in the lower left hand corner will engage the lower surface of the tear tab 84 thereby serving to lift the tear tab from the releasably retaining finger 106 to thereby permit the resilient tear tab to shift to its fixed final assembly position as depicted in FIG. 2 wherein it is in positive engagement with the outermost convolution of the film strip passing from the supply spool 26.

Referring now to the slide valve 76 and its side cams 88 through which the film strip 40 passes when the cassette is in its final assembled position, it will be noted in FIG. 3 that, with the modular processor 80 in its preliminary assembly position, the right hand end of the slide valve 76 and the cams 88 carried thereby are positioned upwardly out of the path of the film strip 40 when the cassette is in the preliminary assembly condition. Movement of the modular processor 80 to its final assembly position operably engages and downwardly displaces the slide valve 76 to its final assembly position wherein the film strip passes between the side cams 88 as shown in FIGS. 1 and 2. With further reference to FIGS. 1 and 2, it will be seen that the slide valve 76 is provided at its extreme left hand end with an angularly disposed extension 142 which engages a similarly angularly disposed structural portion 144 of the cassette housing. These cooperating elements serve to retain the slide valve 76 in the position depicted in FIGS. 1 and 2 until such time as the film strip positively engages the valve and displaces it to its final processor disabling position as described hereinabove. It is this engagement between the angularly disposed element 142 of the slide valve and the mating cassette portion 144 which imparts a force which causes the right hand end of the slide valve to rotate upwardly to the position illustrated in FIG. 3 wherein the valve lies substantially out of the film strip path. The details of such slide valve retention means are described in detail in U.S. Pat. No. 4,106,042 to F. M. Czumak et al. and assigned to the assignee of the present application.

Accordingly, a multipurpose film cassette is provided having a cassette housing with support means which cooperate with a modular processor for releasably supporting the processor in a preliminary assembly position within the housing where the processor is spaced from the path of the film strip and wherein it cooperates with at least one of the other cassette components to thereby permit such component to also be in a preliminary assembly position within the housing. The modular processor is displaceable from its preliminary assembly position to a final assembly position wherein the processor is supported in operable engagement with the film strip and thus is capable of actuation to effect the fluid deposition process. The movement of the processor from its preliminary assembly position to the final assembly position also results in movement of one or more cassette contained components from a preliminary to a final operable position.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

I claim:

1. In a multipurpose film handling cassette of the type having a housing containing for exposure and processing a strip of photographic film, said housing also containing a modular fluid processing means; said modular fluid processing means comprising a fluid reservoir filled with processing fluid, said reservoir being initially sealed by a releasable tear tab closure which is removable from said reservoir after film strip exposure for deposition of the processing fluid on the film strip during movement of the film strip along a given path; said processor having a fluid deposition nozzle supported in spaced relation with said reservoir with said tear tab closure initially positioned therebetween, said modular processing means having a fixed final assembly condition within the cassette housing in which a part of said nozzle and one or more other components of said processing means are in positive contact with a portion of said film strip lying in said given path, the improvement comprising:

structural support means within said cassette housing for supporting said modular processor in a preliminary assembly position wherein said nozzle and said one or more other components of said modular processor are spaced from said given path of said film strip, thereby facilitating threading of the film strip therepast, said modular processor being displaceable responsive to an external force from said preliminary assembly position to a final position wherein said nozzle and said one or more other components of said modular processor are in engagement with said film strip following threading of the film strip therepast, thereby putting said modular processing means it its fixed final assembly condition.

2. The apparatus of claim 1 wherein said tear tab closure has a free end, said free end having a final assembly position wherein its lies in contact with said film strip when said processing means is in its fixed final assembly condition;

said film strip including means for operatively engaging said free end of said tear tab closure and to advance said tear tab closure, responsive to film advancement along said given path, to effect the removal thereof from said reservoir; and said modular processor further comprising means for releasably constraining said free end in a preliminary assembly position spaced from said film strip when said modular processor is in its said preliminary assembly position, and, means within said cassette housing for effecting release of said free end from said preliminary position to its said final assembly position responsive to displacement of said modular processor to its said fixed position.

3. The apparatus of claim 2 wherein said means for releasably constraining said free end comprises an opening in said free end and means carried by said reservoir for releasably engaging said opening in said tear tab when said processing means is in its preliminary position, and wherein said means for effecting release of said free end from said preliminary position comprises a portion of said structural support means within said cassette housing which contacts said free end of said tear tab upon displacement of said modular processor to its said fixed final position thereby releasing the opening in said tear tab closure from the constraining means carried by said reservoir.

4. The apparatus of either claim 1 or 2 further including means for disabling said film processing means following deposition of said processing fluid upon said film strip, said disabling means being operable responsive to film advancement along said given path, said disabling means having a preliminary assembly position within said housing wherein it is spaced at least partially from said given path of said film strip, said disabling means being displaceable from said preliminary position by said modular processor upon displacement of said processor to its final position to a final assembly condition wherein it is capable of said actuation to effect disabling of said processor means.

* * * * *